United States Patent [19]
Bould

[11] Patent Number: 4,565,908
[45] Date of Patent: Jan. 21, 1986

[54] DRAWOUT SWITCHGEAR APPARATUS WITH RETRACTABLE SHUTTER MECHANISM FOR TERMINAL STABS

[75] Inventor: Fred Bould, Edgewood Boro, Pa.

[73] Assignee: Westinghouse Electric Corp., Pittsburgh, Pa.

[21] Appl. No.: 680,691

[22] Filed: Dec. 12, 1984

[51] Int. Cl.[4] .............................................. H02B 1/04
[52] U.S. Cl. ............................... 200/50 AA; 361/337; 361/345
[58] Field of Search ................................. 361/337–339, 361/336, 345, 343, 391; 200/50 AA, 304, 305

[56] References Cited

U.S. PATENT DOCUMENTS

| | | | |
|---|---|---|---|
| 3,096,131 | 7/1963 | Adams | 339/22 B |
| 3,133,820 | 12/1963 | Norden | 339/22 B |
| 3,170,092 | 2/1965 | Adams | 361/361 |
| 3,483,338 | 12/1969 | Bould | 200/50 AA |
| 3,840,785 | 10/1974 | Olashew | 174/99 B |
| 4,038,585 | 7/1977 | Wolski | 361/334 |
| 4,285,026 | 8/1981 | Clausing | 361/337 |
| 4,351,990 | 9/1982 | Hesselbart | 200/50 AA |
| 4,384,179 | 5/1983 | Milianowicz | 200/50 AA |
| 4,395,602 | 7/1983 | Castonguay | 361/345 |
| 4,477,701 | 10/1984 | Castonguay | 200/50 AA |
| 4,486,815 | 12/1984 | Takahashi | 361/345 |

*Primary Examiner*—G. P. Tolin
*Attorney, Agent, or Firm*—L. P. Johns

[57] ABSTRACT

Drawout switchgear apparatus characterized by a cell having a plurality of spaced fixed terminal stabs therein, an insulating shutter structure extending across the terminal stabs, a switchgear unit removably disposed in the cell and including terminal means for detachably engaging with the terminal stabs during movement into and out of the cell, obstruction means retractably mounted for preventing movement of the shutter when the switchgear unit is removed from the cell, and trigger means on the unit for retracting the obstruction means when the unit moves into the cell for exposing the stabs to the terminal means of the unit.

2 Claims, 11 Drawing Figures

DRAWOUT SWITCHGEAR APPARATUS WITH RETRACTABLE SHUTTER MECHANISM FOR TERMINAL STABS

CROSS-REFERENCE TO RELATED APPLICATION

This application is related to the copending application Ser. No. 608,638, filed Dec. 12, 1984, concurrently herewith entitled "Drawout Switchgear Apparatus with Extensible Tracks" of Fred Bould, assigned to the present assignee.

BACKGROUND OF THE INVENTION

1. Field of the Invention

This invention relates to drawout switchgear apparatus and more particularly to an insulating shutter mechanism for preventing accidental contact with terminal stabs when the switchgear is removed therefrom.

2. Description of the Prior Art

When a circuit breaker or similar apparatus of the horizontal drawout type is mounted in a cell or housing, bus bars and terminal stabs are usually not readily accessible to operating personnel. However, when the circuit breaker is removed from the cell or housing, the bus bars and terminal stabs are exposed and constitute a hazard due to accidental personal contact during inspection or maintenance. For example, reference is made to U.S. Pat. Nos. 3,096,131; 3,113,820; 3,170,092; 4,038,585; and 4,384,179; 3,840,785.

SUMMARY OF THE INVENTION

In accordance with this invention, it has been found that drawout switchgear apparatus may be provided which comprises a cell having a plurality of spaced, fixed terminal stabs disposed therein; a switchgear unit removably disposed in the cell and including terminal means for detachably engaging the terminal stabs during movement into and out of the cell; a barrier of electrically insulative material including first and second shutters having opening means for receiving the stabs; support means for movably mounting the shutters between positions of nonalignment and alignment of the opening means with the stabs and biased in the nonalignment position; obstruction means retractably mounted in the path of movement of the shutters for barring movement from the position of nonalignment; trigger means on the unit for releasing the obstruction means when the switchgear unit moves into the cell so as to retract the obstruction means from the path of movement of the shutter to enable the opening means to align with the stabs and to enable connection of the terminal means with corresponding stabs.

The advantage of the device of this invention is that a safety shutter, which is operated by movement of the circuit breaker and which takes up no extra space other than what is needed for normal breaker insulation, is provided and permits the shutter to be in position in the breaker test position.

DESCRIPTION OF THE PREFERRED EMBODIMENT

In the drawings, a drawout switchgear is generally indicated at 5 and it comprises a circuit interrupter or circuit breaker 7 and a cell or housing 9. Generally, the circuit breaker 7 is similar in construction and operation to that shown in U.S. Pat. No. 3,483,338 entitled "Track Structure for Drawout Switchgear Apparatus" of which the inventor is F. Bould et al. The circuit breaker 7 is contained in a molded housing composed of high strength phenolic resin, such as reinforced glass fiber. Movable terminal means or terminals 11, 13 (FIG. 1) extend from the rear wall of the circuit breaker. Stationary terminal means or stabs 15, 17 extend through a rear wall 19 of the cell 9 and are connected to bus bars (not shown) on the right side of the wall as viewed in FIG. 1. An electrical circuit through the switchgear 5 extends from the stab 15 through the terminal 11, the circuit breaker 7 to the terminal 13, and the stab 17.

The cell 9 comprises opposite side walls 21, 23, the rear wall 19, and a front opening 25.

Figure 1:
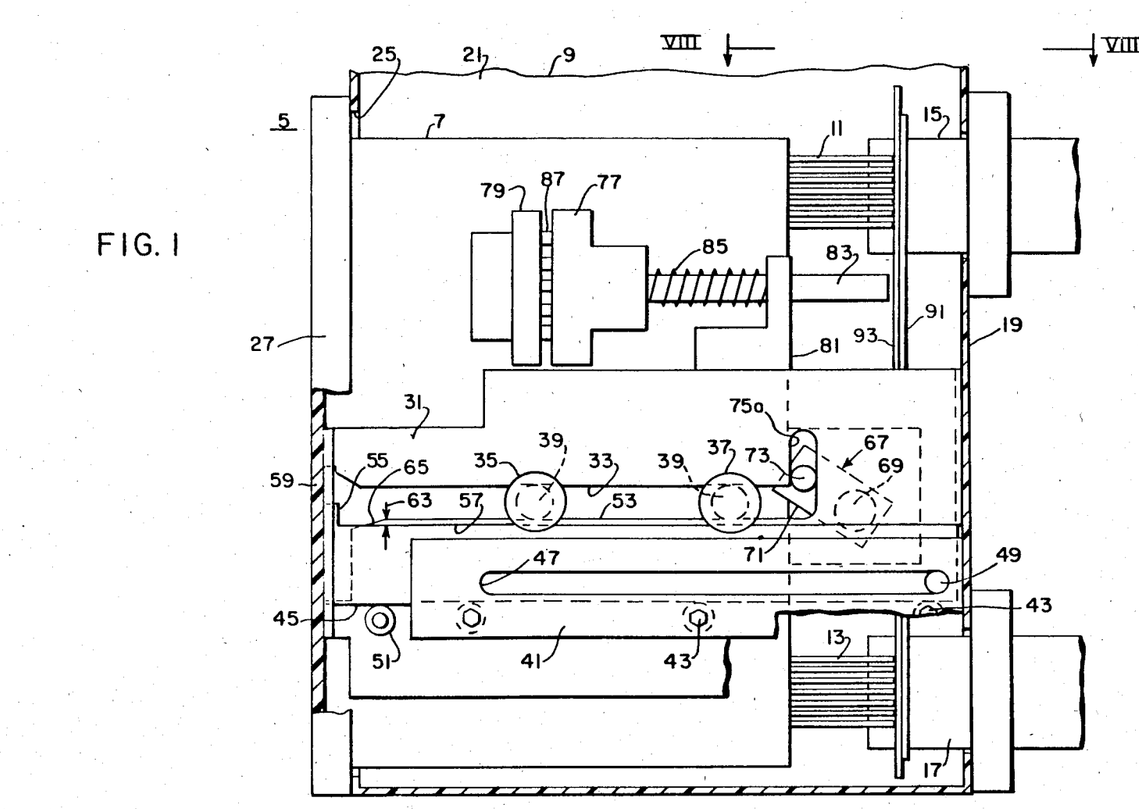
FIG. 1 is a side elevation view of the switchgear apparatus embodying the invention and illustrating a removable unit fully disposed within an associated cubicle or cell.
Figure 4:
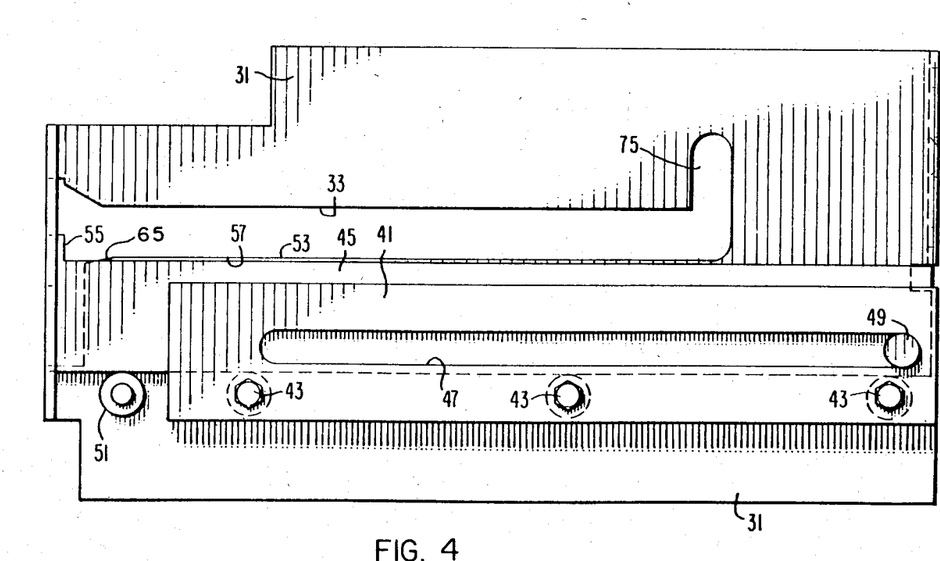
FIG. 4 is a side elevational view of the frame and track.
Figure 5:
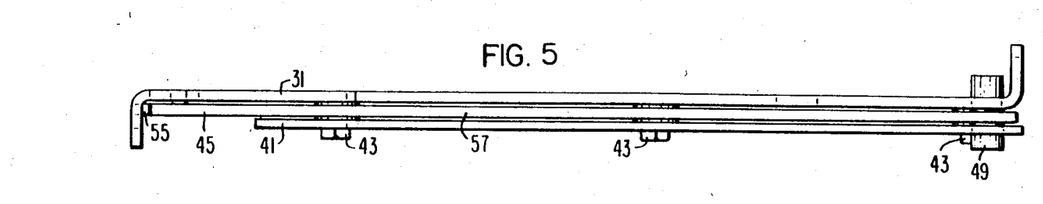
FIG. 5 is a plan view taken on the line V—V of FIG. 4.
Figure 6:
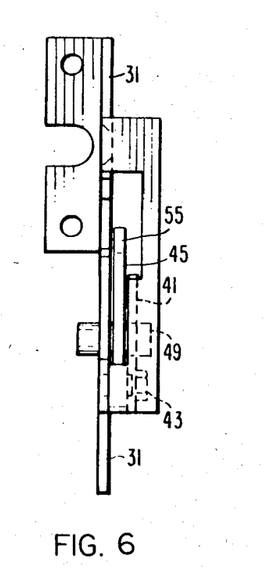
FIG. 6 is an end view taken on the line VI—VI of FIG. 4.
Figure 7:
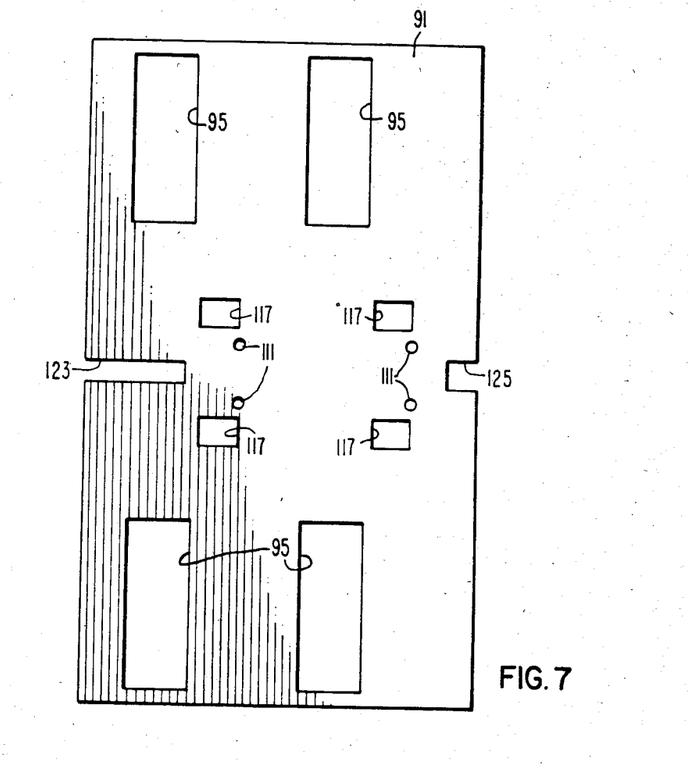
FIG. 7 is an elevational view of the pivot shutter.

The circuit breaker 7 includes a front panel 27 which closes the front opening 25 when the circuit breaker is in the operational or connected position (FIG. 1). Frame members 29, 31 (FIG. 8) are mounted on opposite sides of the cell 9 for supporting the circuit breaker 7. For that purpose (FIGS. 4, 5, 6), each frame member includes a slot 33 for supporting wheels or rollers 35, 37 which are mounted on similar axles or pins 39 extending from opposite sides of the circuit breaker. Each frame member 29, 31 includes a bracket 41 mounted on and spaced from the frame member by spaced bolts 43.

Figure 3:
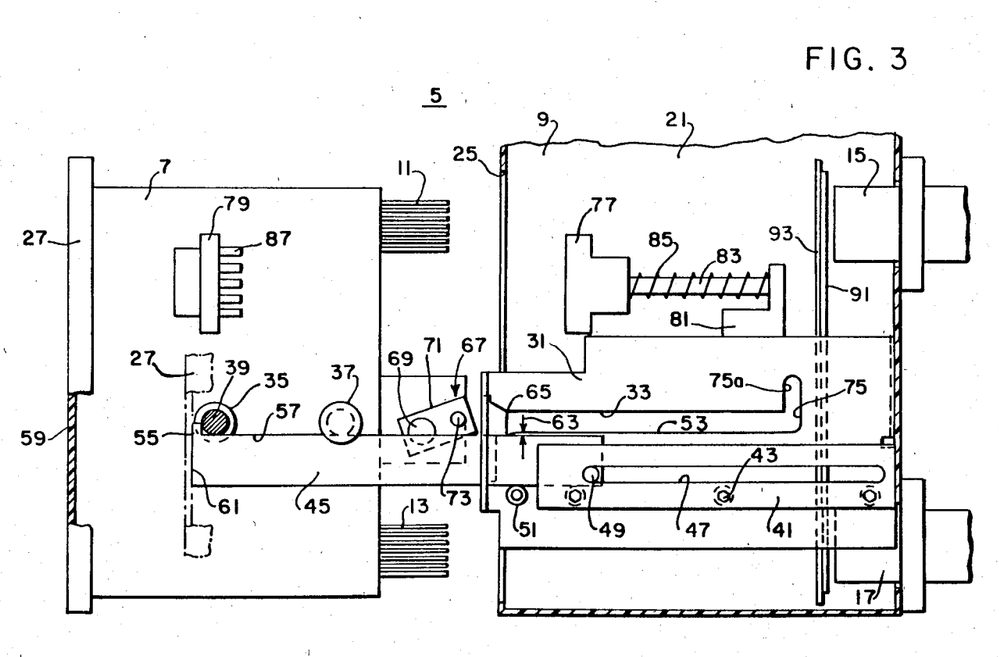
FIG. 3 is a view similar to FIG. 2 but with the removable unit completely withdrawn from the operating position of FIG. 1 and supported on extensible tracks.

An extensible track 45 is mounted on each frame member 29, 31 where it is retained in place by corresponding brackets 41. Each bracket 41 includes a longitudinal slot 47 in which a retainer pin 49 on the track is disposed. A support bearing 51 is also mounted on the frame member for supporting the extensible track when it is completely extended (FIG. 3). When the circuit breaker 7 is in the completely installed or connected position (FIG. 1), the extensible track 45 is withdrawn in the retracted position.

Figure 2:
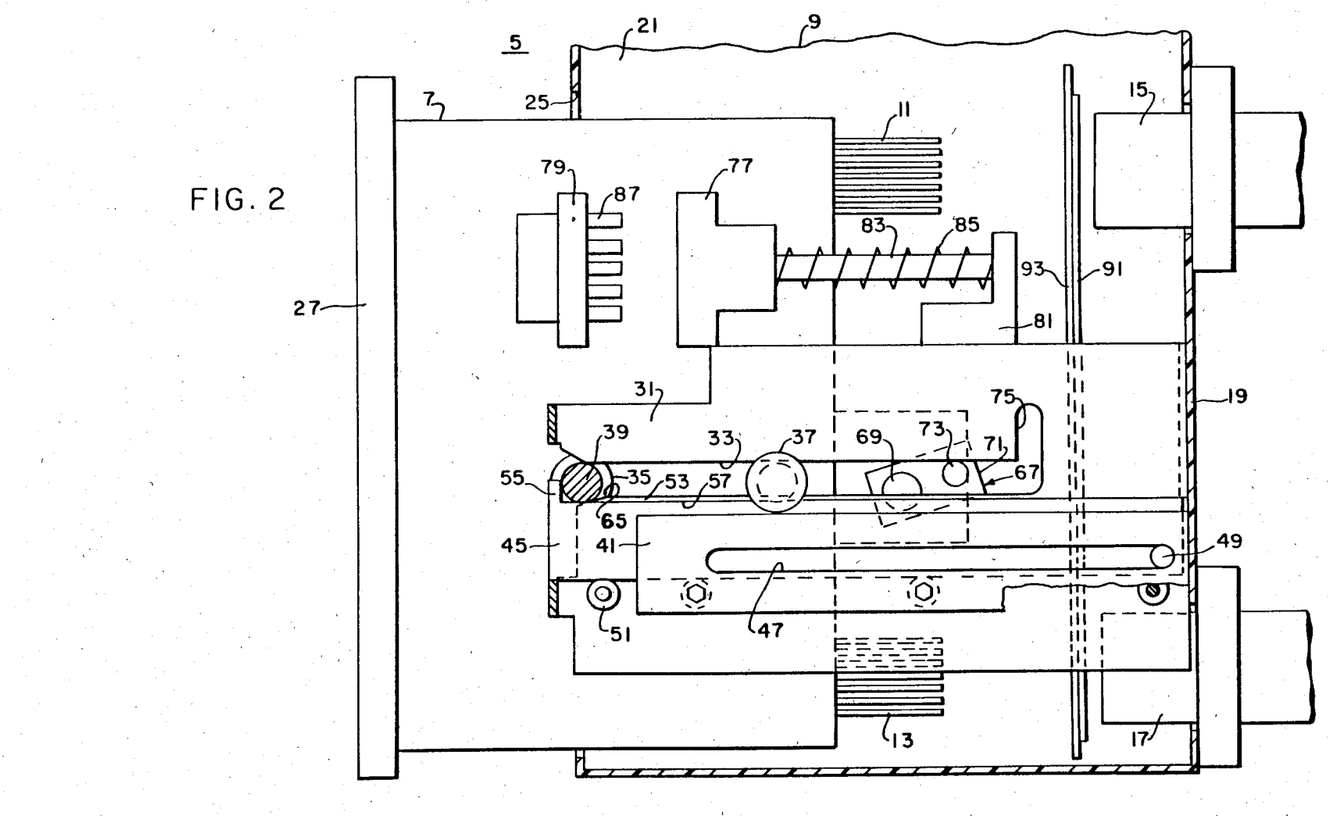
FIG. 2 is a view similar to FIG. 1 but with the removable unit partially withdrawn from the cubicle or cell.

As the circuit breaker 7 is withdrawn from the cell 9, from the position of FIG. 1 to that of FIG. 2, the rollers 35, 37 move leftward in the slot 33 on a support surface 53 until the roller 35 engages means for protracting the extensible track or track extension, such as an upturned lip or projection 55. Continued withdrawal of the unit or circuit breaker 7 moves the extensible track with the circuit breaker due to the force of the roller 35 on the projection 55, the track being supported on the support bearing 51 mounted on the frame member 31. Further withdrawal of the circuit breaker or unit 7 from the position of FIG. 2 to that of FIG. 3 causes the rollers 35, 37 to move off of the support surface 53 onto a surface 57 of the track 45 upon which the circuit breaker is completely supported. As shown in FIG. 3, the track 45 is sustained in position by the roller bearing 51 and pin 49 in the slot 47 of the bracket 41.

As the circuit breaker 7 is returned from the fully withdrawn position (FIG. 3) to the connected or operational position (FIG. 1), the rollers 35, 37 retract upon the surface 57 of the track 45 until a panel surface 59 encounters the outer end 61 of the track 45 to retract the track into the position between the frame member 31 and bracket 41 (FIGS. 4-7). As retraction continues from the withdrawn position (FIG. 3), the roller 37 moves into the slot 33 and onto the support surface 53.

As indicated in FIG. 3 by arrow 63, the support surface 53 is slightly higher (about 0.031 inch) than that of the track surface 57 so that, as the circuit breaker moves into the cell 9, the roller 37 and subsequently the roller 35 move up an inclined surface 65, thereby transferring the load of the circuit breaker from the extensible track 45 to the frame member 31. Thereafter, the rollers continue moving within the slot 33 until the circuit breaker is in the connected position (FIG. 1) with terminals 11, 13 engaging stabs 15, 17, respectively.

A levering-in mechanism, generally indicated at 67, is provided to move the circuit breaker 7 securely into the connected position of the terminals 11, 13 with the stabs 15, 17. The mechanism 67 includes an operating shaft 69, a cam lever 71 on the shaft, and a camming pin 73. As the circuit breaker 7 is returned into the cell, the camming pin 73 enters the slot 33 until it is positioned at the right end of the slot where an upturned slot camming portion 75 is provided. Thereafter, rotation of the operating shaft 69, such as manually, by a lever not shown in the drawing, the cam lever 71 is rotated counterclockwise, causing the pin 73 to move into the slot camming portion 75 where it cams against slot surface 75a (FIG. 1) of the portion 75 for moving and locking the terminals 11, 13 and stabs 15, 17 into good electrical contact.

In addition to the terminals 11, 13 and terminal stabs 15, 17, secondary connectors or contacts 77 are retractably mounted on sidewalls 21, 23 on opposite sides of the cell. Secondary terminals or contact terminals 79 are mounted on the outer sides of the circuit breaker 7 for retractable engagement with the secondary connectors 77. For that purpose the secondary connectors 77 are mounted on a retractable means comprising a mounting bracket 81, a guide pin 83 generally mounted in the bracket, and a coil spring 85. The secondary terminal 79 comprises a plurality of terminals 87 which extend into corresponding sockets in the secondary connector 77 when in the intermediate or test position. Conductor wires (not shown) extend from each of the secondary connectors 77 and the secondary terminals in a conventional manner.

Figure 1A:
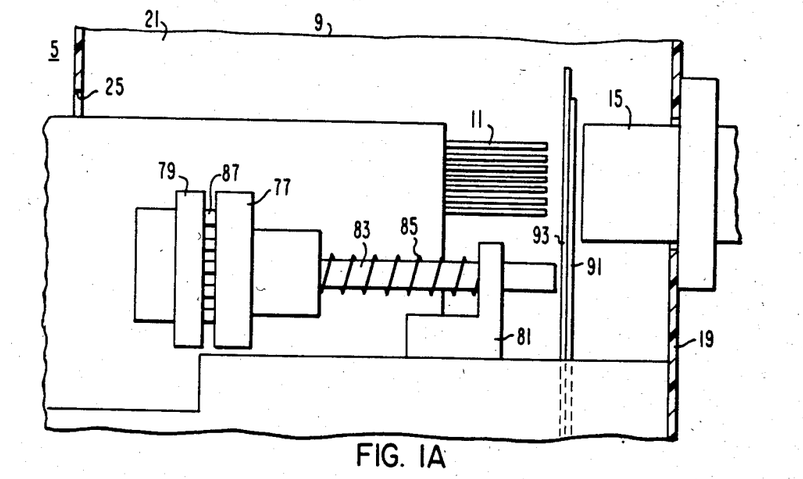
FIG. 1A is a fragmentary side elevation view showing the removable unit in an intermediate or test position.

When the circuit breaker 7 moves into the cell 9, it moves through disconnected, intermediate or test, and connected positions. In the disconnected position (FIG. 3), the terminals 11, 13 are disconnected from the stabs 15, 17 and the secondary connector 77 and secondary terminal 79 are disengaged. In the intermediate or test position (FIG. 1A), the secondary connectors 77 and secondary terminal 79 are connected, however, the terminals 11, 13 and stabs 15, 17 are disengaged. Finally, when the circuit breaker moves to the connected position (FIG. 1), the terminals and stabs 11-17 are interconnected as well as the secondary connectors and terminals 77, 79.

Associated with the foregoing is a barrier generally indicated at 89 (FIG. 8) for preventing accidental contact with the stationary terminal means or stabs 15 when the circuit breaker 7 is retracted from the stabs. The barrier 89 comprises a pair of superimposed shutters including a shutter 91 and a shutter 93. Both shutters are composed of an electrically insulative material, such as a high strength phenolic resin. The shutter 91 (FIG. 7) is comprised of four similar holes 95 adapted for receiving the stabs 15. The shutter 93 (FIG. 10) is comprised of a plurality, such as six, openings 97 which, when aligned with holes 95 of the shutter 91, enable the terminals 11, 13 to retract the barrier 89 from the position of FIG. 8 until the terminals 11 engage the stabs 15 (FIG. 9).

Figure 8:
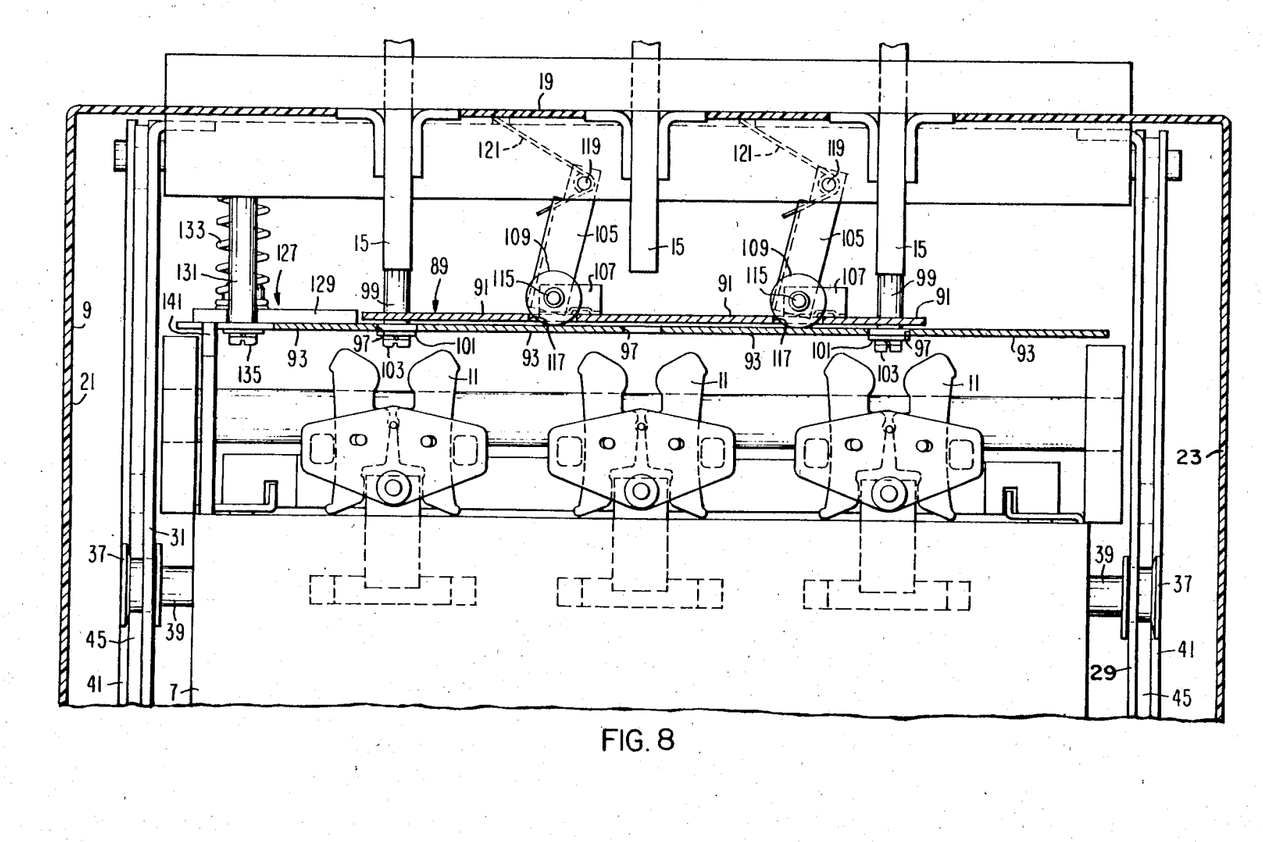
FIG. 8 is an enlarged fragmentary view showing the circuit breaker in a retracted position from the stabs taken on the line VIII—VIII of FIG. 1.
Figure 9:
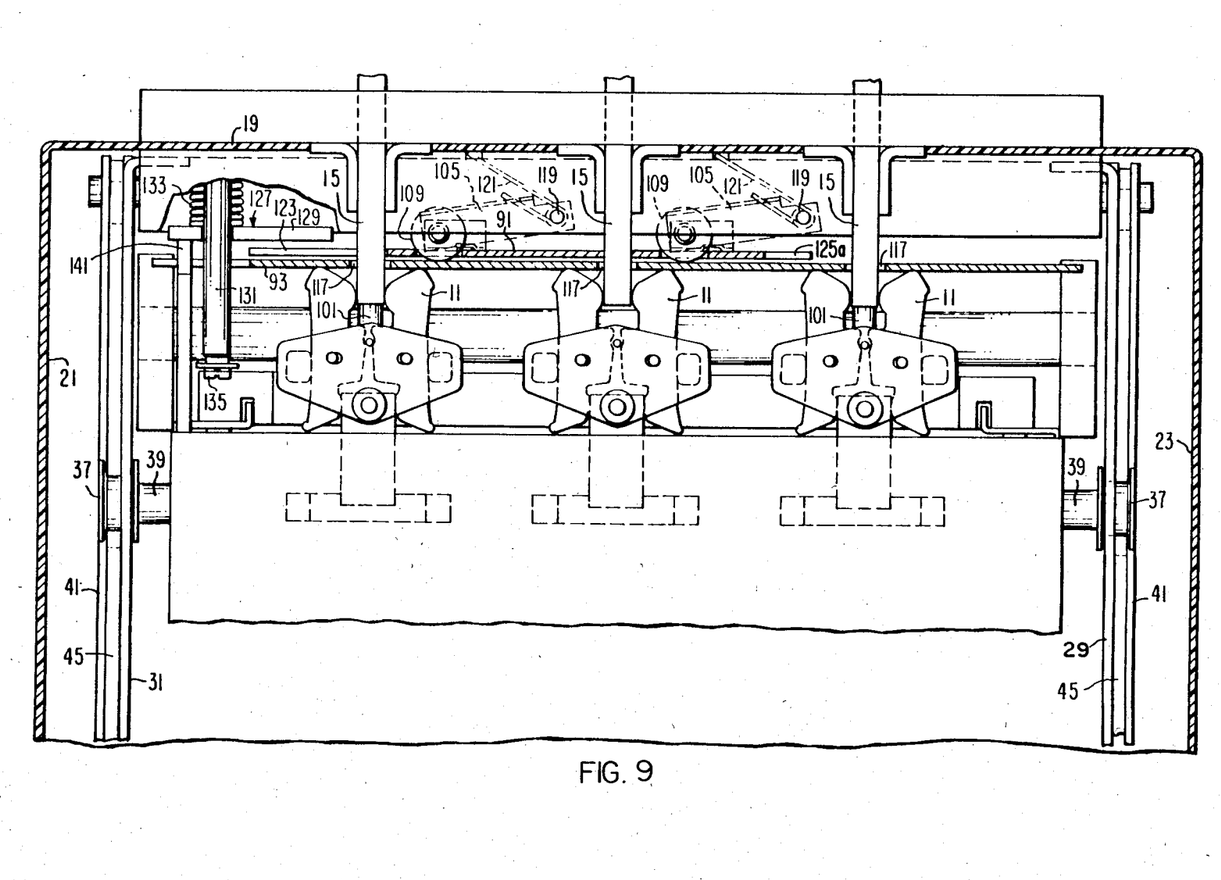
FIG. 9 is a view similar to FIG. 8 but showing the circuit breaker in the fully connected position.
Figure 10:
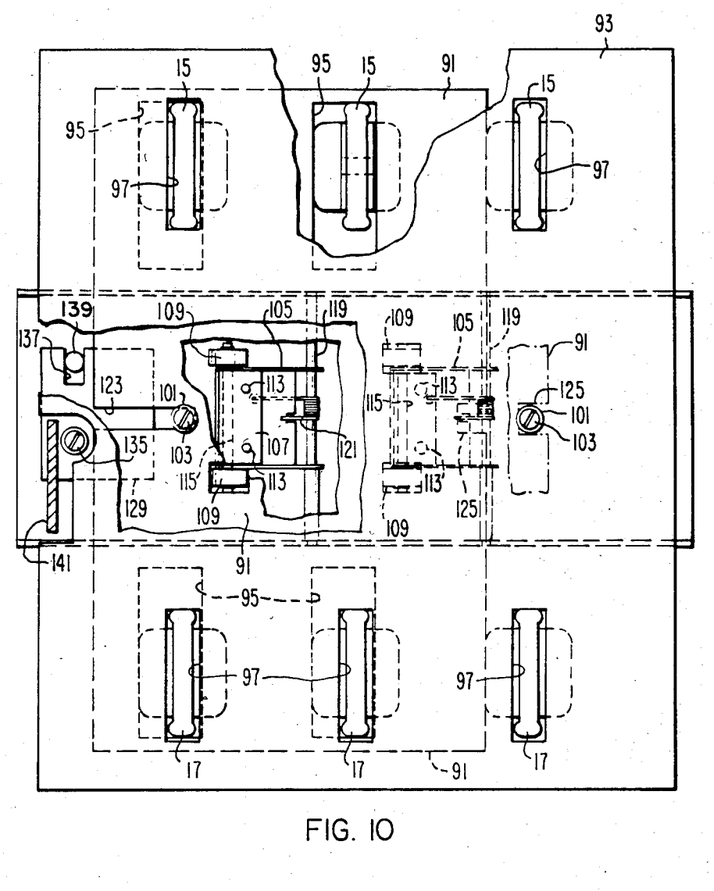
FIG. 10 is a sectional view showing the pair of shutters aligned for the fully connected position as shown in FIG. 9.

As shown in FIGS. 8 and 10, the shutter 93 is slidably mounted on a pair of horizontally spaced posts 99, the outer ends of which are provided with similar washers 101 secured in place by similar screws 103 in the end of the posts.

As shown in FIGS. 8 and 10, the shutter 91 is mounted on a pair of similar pivot links 105 having mounting brackets 107 and rollers 109. The shutter 91 includes holes 111 (FIG. 7) to enable attachment of the shutter to the bracket 107 by suitable means such as rivets 113. The brackets are pivotally mounted on pivot pins 115 on which the rollers are likewise mounted. The rollers extend through holes 117 (FIG. 7) and engage the surface of the sliding shutter 93 adjacent to the pivoting shutter 91. The inner ends of the pivot links 105 are pivotally mounted on a frame at pivot pins 119. Wire springs 121 bias the links 105 counterclockwise about the pins 119 for holding the shutters 91, 93 against the washers 101 at the left end of the posts 99. The posts are disposed between upper and lower pairs of stabs 15, 17 and are secured to a frame member mounted on the rear wall 19.

When pressure is applied against the shutter 93, the shutter yields against the rollers 109 which contact the shutter through openings 117 in the shutter 91, causing the links 105 to rotate clockwise about pivot pins 119. This causes the shutter 91 to move sideways and backwards until the holes 95 move into alignment with openings 97 and with the stabs 15, 17. In the shutter position of FIG. 8, the posts 99 support the shutter 91 by means of slots 123, 125 (FIG. 10). As the shutter 91 moves into the position of FIG. 10, the slot 123 slides over the post 99 and the slot 125 moves to the left out of contact with the post 99 to a position 125a, whereby the shutters have moved to the retracted position (FIG. 9).

In accordance with this invention, means generally indicated at 127 (FIG. 8) are provided for preventing movement of the barrier 89 backwards, which means includes a block 129 disposed in the path of movement of the shutter 91 as it moves laterally across the stabs 15. The block is mounted on a post 131 where it is retained by a coil spring 133 against a flanged screw 135. As shown in FIG. 10, the block 129 is provided with a slot 137 in which a guide pin 139 is in the upright position as it moves back and forth into and out of position for blocking lateral movement of the shutter 91.

Accordingly, when the circuit breaker 7 is in the withdrawn position (FIG. 3) and/or removed completely from the front of the cell 9, the barrier prevents personnel from accidentally contacting the stabs 15, 17 during maintenance of the interior of the cell structure. In other words, any pressure against the barrier 89 during maintenance operations does not cause the barrier to retract, because the obstruction means 127 prevent the shutter 91 from moviing laterally.

When the circuit breaker 7 moves into the connected position of FIG. 1, trigger means, including a projection 141, which extends ahead of the front portions of the several terminals 11, 13, contacts the blocks 129 (FIGS. 8, 10) and retracts the block against the spring 133, thereby removing the block as an obstruction in the path of movement of the shutter 91. Thereafter, as the terminals 11, 13 confront the shutter 93, it retracts against the shutter 91 and rollers 109, which yield against the springs 121 to cause the holes and openings of the shutters 91, 93 to become aligned and pass over the stationary stabs 15, 17 for contact by the terminals 11, 13.

Conversely, when the circuit breaker 7 is withdrawn from the stabs 15, 17, the pressure of the wire springs 121 moves the barrier 89 back to the protective position of FIG. 8 and the spring 133 moves the block 129 into the position of FIG. 8.

Accordingly, the shutter mechanism provides a safety structure for protecting maintenance personnel from inadvertent contact with the electric stabs 15, 17.

What is claimed is:

1. Switchgear apparatus comprising:
    a cell;
    a plurality of spaced fixed terminal stabs in the cell;
    a switchgear unit removably disposed in the cell and including terminal means for detachably engaging the terminal stabs during movement into and out of the cell;
    a barrier of electrically insulative material including a first shutter having opening means for receiving the stabs;
    support means including links movably mounting the shutter between lateral positions of nonalignment and alignment of the opening means with the stabs and biased in the nonalignment position;
    obstruction means retractably mounted in the path of movement of the shutter for barring movement of the shutter from the nonalignment position;
    the unit including trigger means releasing the obstruction means when the unit moves into the cell so as to retract the obstruction means from the path of movement of the shutter to enable the opening means to align with the stabs and to enable connection of the terminal means with corresponding stabs;
    a second shutter adjacent to the first shutter and having holes aligned with the stabs, the second shutter being biased away from the stabs and is disposed on the side of the first shutter away from the stabs; and
    the links including roller means extending through the opening means for rolling contact with the second shutter so that as the unit moves into the cell the unit retracts the second shutter and causes the first shutter to retract laterally and to thereby bring the opening means into alignment with the stabs whereby the stabs are exposed to the terminal means.

2. The switchgear apparatus of claim 1 in which a secondary connector is mounted on one of the cell and the unit, a secondary connector termnal mounted on the other of the cell and the unit, one of the secondary connector and secondary connector terminal being mounted yieldingly to enable their connection before connection of the terminal stabs and terminal means when the unit moves into the cell, and the shutter being in position of nonalignment as the secondary connector and secondary connector terminal are connected.

* * * * *